(12) United States Patent
Rangarajan et al.

(10) Patent No.: US 10,248,558 B2
(45) Date of Patent: Apr. 2, 2019

(54) MEMORY LEAKAGE POWER SAVINGS

(71) Applicant: QUALCOMM Incorporated, San Diego, CA (US)

(72) Inventors: Bharat Kumar Rangarajan, Bangalore (IN); Rakesh Misra, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/690,197

(22) Filed: Aug. 29, 2017

(65) Prior Publication Data
US 2019/0065359 A1 Feb. 28, 2019

(51) Int. Cl.
G06F 3/06 (2006.01)
G06F 12/08 (2016.01)
G06F 1/32 (2019.01)
G06F 12/02 (2006.01)
G06F 1/3206 (2019.01)
G06F 1/3234 (2019.01)
G06F 11/36 (2006.01)
H02H 3/32 (2006.01)

(52) U.S. Cl.
CPC ........ *G06F 12/0238* (2013.01); *G06F 1/3206* (2013.01); *G06F 1/3234* (2013.01); *G06F 3/0625* (2013.01); *G06F 11/3656* (2013.01); *H02H 3/32* (2013.01); *G06F 2212/1028* (2013.01); *G06F 2212/1032* (2013.01)

(58) Field of Classification Search
CPC .... G06F 1/3203; G06F 1/3206; G06F 1/3234; G06F 1/3237; G06F 1/3287; G06F 3/0625; G06F 12/0802; G06F 12/0877; G06F 2212/1028
See application file for complete search history.

(56) References Cited

U.S. PATENT DOCUMENTS

| | | | |
|---|---|---|---|
| 4,855,994 A | 8/1989 | Takeuchi et al. | |
| 5,193,198 A | 3/1993 | Yokouchi | |
| 2003/0120962 A1* | 6/2003 | Dai | G06F 1/3203 713/320 |
| 2004/0117678 A1* | 6/2004 | Soltis, Jr. | G06F 1/206 713/320 |
| 2004/0199803 A1 | 10/2004 | Suzuki et al. | |
| 2006/0059380 A1 | 3/2006 | Kimura | |
| 2006/0190747 A1 | 8/2006 | Fukumori | |
| 2011/0252251 A1* | 10/2011 | de Cesare | G06F 1/3203 713/320 |
| 2013/0173865 A1 | 7/2013 | Wu et al. | |

(Continued)

OTHER PUBLICATIONS

International Search Report and Written Opinion—PCT/US2018/044769—ISA/EPO—dated Oct. 24, 2018.

*Primary Examiner* — Hal Schnee
(74) *Attorney, Agent, or Firm* — Qualcomm Incorporated

(57) ABSTRACT

In some aspects, a method for managing leakage power includes coupling a first supply rail to a cache memory if a processor is in a first performance mode, wherein the processor accesses the cache memory, and coupling a second supply rail to the cache memory if the processor is in a second performance mode. The method also includes detecting gating of a clock signal to the cache memory or the processor, and, upon detecting gating of the clock signal, switching the cache memory from the second supply rail to the first supply rail if the cache memory is currently coupled to the second supply rail.

18 Claims, 5 Drawing Sheets

(56) References Cited

U.S. PATENT DOCUMENTS

| | | | |
|---|---|---|---|
| 2014/0059325 A1* | 2/2014 | Morimoto | G06F 12/0893 712/42 |
| 2015/0067361 A1* | 3/2015 | Rusu | G06F 1/3275 713/320 |
| 2015/0089261 A1* | 3/2015 | Segawa | G06F 1/3296 713/322 |
| 2016/0109932 A1 | 4/2016 | Jeon et al. | |
| 2016/0308372 A1 | 10/2016 | Kolla et al. | |
| 2017/0060224 A1 | 3/2017 | Cao et al. | |

* cited by examiner

MEMORY LEAKAGE POWER SAVINGS

BACKGROUND

Field

Aspects of the present disclosure relate generally to power management, and more particularly, to reducing leakage power in a low power mode.

Background

Reducing power consumption on a chip is desirable, especially when the chip is in a battery-powered mobile device. Contributors to power consumption on a chip include dynamic power due to switching of transistors on the chip, and leakage power due to current leakage of transistors on the chip. To conserve power, a processor that is not currently active may be placed in one of multiple low power modes. In one of the low power modes, the clock signal to the processor is gated to reduce the dynamic power of the processor while the supply voltage is maintained. In another one of the low power modes, the processor is power collapsed, which further reduces power consumption at the expense of greater latency.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

A first aspect relates to a system. The system includes a cache memory, wherein a processor accesses the cache memory. The system also includes a multiplexer configured to selectively couple a first supply rail or a second supply rail to the cache memory, and a controller configured to instruct the multiplexer to couple the first supply rail to the cache memory if the processor is in a first performance mode, and to instruct the multiplexer to couple the second supply rail to the cache memory if the processor is in a second performance mode. The system further includes a trigger device configured to detect gating of a clock signal to the cache memory or the processor, and, upon detecting gating of the clock signal, to instruct the controller to switch the cache memory from the second supply rail to the first supply rail if the cache memory is currently coupled to the second supply rail.

A second aspect relates to a method for managing leakage power. The method includes coupling a first supply rail to a cache memory if a processor is in a first performance mode, wherein the processor accesses the cache memory, and coupling a second supply rail to the cache memory if the processor is in a second performance mode. The method also includes detecting gating of a clock signal to the cache memory or the processor, and, upon detecting gating of the clock signal, switching the cache memory from the second supply rail to the first supply rail if the cache memory is currently coupled to the second supply rail.

To the accomplishment of the foregoing and related ends, the one or more embodiments include the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
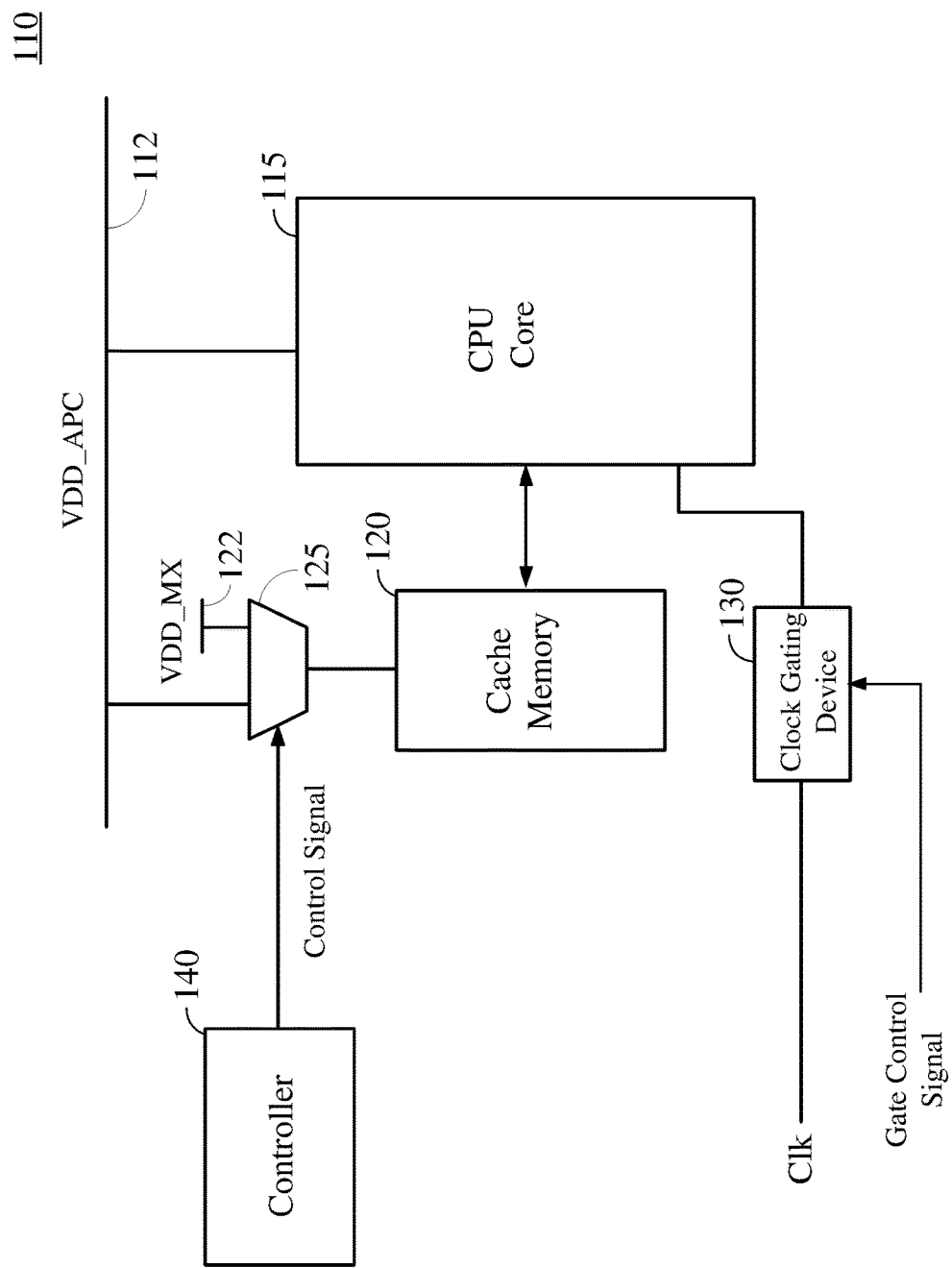
FIG. 1 shows an example of a system including one or more processor cores and a cache memory according to certain aspects of the present disclosure.

FIG. 1 shows an example of a system 110 on a chip. The system 110 includes one or more central processing unit (CPU) cores 115 and a cache memory 120. Although one CPU core 115 is shown in FIG. 1 for ease of illustration, it is to be appreciated that the system 110 may include a cluster of CPU cores. The CPU core 115 receives a supply voltage (labeled "VDD_APC") from an application processor cluster (APC) supply rail 112 for powering the CPU core 115. The CPU core 115 also receives a clock signal (labeled "Clk") for timing operations of the CPU core 115.

The cache memory 120 provides the CPU core 115 with faster memory access than main memory (e.g., DRAM), and may be used to store instructions that are to be executed next by the CPU core 115. The cache memory 120 is powered by either supply voltage VDD_APC or a memory supply voltage (labeled "VDD_MX") depending on the performance mode of the CPU core 115, as discussed further below. Supply voltage VDD_MX is provided by a memory (labeled "MX") supply rail 122.

The system 110 also includes a multiplexer 125 and a multiplexer controller 140. The multiplexer 125 is configured to selectively couple either the APC supply rail 112 or the MX supply rail 122 to the cache memory 120 according to a control signal from the multiplexer controller 140. For brevity, the multiplexer controller 140 is referred to simply as the controller 140 in the discussion below.

The CPU core 115 is configured to operate in one of multiple performance modes (e.g., based on current performance requirements of the core 115). For example, the performance modes may include a normal mode (also referred to as a nominal mode) and a turbo mode, in which the CPU core 115 operates at faster speeds in the turbo mode. An application running on the CPU core 115 may switch the core from the normal mode to the turbo mode when the application requires high performance (e.g., faster processing speeds). To operate the CPU core 115 in the turbo mode, the voltage level of supply voltage VDD_APC is increased and the frequency of the clock signal Clk is increased. This is done to enable the CPU core 115 to operate at faster speeds. However, the higher supply voltage and higher clock frequency in the turbo mode result in higher dynamic power and leakage power. Thus, the turbo mode provides higher performance (e.g., faster processing speeds) at the expense of higher power consumption.

In the normal mode, the controller 140 instructs the multiplexer 125 to couple the MX supply rail 122 to the cache memory 120. Thus, in the normal mode, the cache memory 120 is powered by supply voltage VDD_MX.

When the CPU core 115 switches from the normal mode to the turbo mode, the controller 140 instructs the multiplexer 125 to switch the cache memory 120 from the MX supply rail 122 to the APC supply rail 112. Thus, in the turbo mode, the cache memory 120 is powered by supply voltage VDD_APC. In the turbo mode, supply voltage VDD_APC is higher than supply voltage VDD_MX. The higher supply voltage allows the cache memory 120 to operate at higher speeds in the turbo mode, and therefore provide the CPU core 115 with faster memory access in the turbo mode. The controller 140 instructs the multiplexer 125 to switch the cache memory 120 back to the MX supply rail 122 when the CPU core 115 switches from the turbo mode back to the normal mode.

The system 110 may be placed in any one of multiple low power modes (also referred to as low power states) when the CPU core 115 is not active to conserve power. In a first low power mode, the clock signal Clk to the CPU core 115 is gated. In this regard, the system 110 includes a clock gating device 130 (also referred to as a clock gating cell) configured to selectively gate the clock signal Clk according to a gate control signal (also referred to as a gate enable signal). In the active mode, the gate control signal causes the clock gating device 130 to pass the clock signal Clk to the CPU core 115. In the first low power mode, the gate control signal causes the clock gating device 130 to gate the clock signal Clk. Gating of the clock signal Clk in the first low power mode reduces dynamic power by stopping switching activity in the CPU core due to the clock signal Clk. In the first low power mode, supply voltage VDD_APC is maintained. As a result, the system 110 suffers from leakage power in the first low power mode. The system 110 may be placed in the first low power mode, for example, when the CPU core 115 is idle. In the active mode, the system 110 may be in the normal mode or the turbo mode (e.g., depending on the performance requirements of the CPU core 115).

In a second low power mode, supply voltage VDD_APC is power collapsed, which reduces leakage power to approximately zero. While the second low power mode reduces leakage power to approximately zero, it takes longer for the system 110 to come out of the second low power mode compare with the first low power mode. In other words, the second low power mode has greater latency. This is because supply voltage VDD_APC needs to be restored when coming out of the second low power mode.

It is to be appreciated that the system 110 is not limited to the two exemplary low power modes discussed above. For example, the system 110 also be placed in any one of one or more intermediate low power modes between the first low power mode and the second low power mode (e.g., deepest low power state).

As discussed above, the multiplexer 125 couples the cache memory 120 to supply voltage VDD_APC in the turbo mode. Since supply voltage VDD_APC is greater than supply voltage VDD_MX in the turbo mode, this results in higher leakage power in the cache memory 120 when the CPU core 110 switches from the active mode to the first low power mode in the turbo mode. More particularly, the leakage power in the cache memory 120 increases by a power of three in the turbo mode compared with the normal mode. For example, if supply voltage VDD_APC is approximately 1.056 V in the turbo mode and 0.8 V in the normal mode, then the leakage power in the cache memory 120 increases by a factor of $(1.056/0.8)^3$. Accordingly, there is a need for reducing leakage power in the first low power mode when the clock signal Clk is gated in the turbo mode.

Aspects of the present disclosure reduce leakage power in the first low power mode when the clock signal Clk is gated in the turbo mode. This is accomplished by switching the cache memory 120 from supply voltage VDD_APC to supply voltage VDD_MX when the clock signal Clk is gated in the turbo mode. This reduces leakage power in the cache memory 120 since supply voltage VDD_MX is lower than supply voltage VDD_APC in the turbo mode. When the clock signal Clk is enabled again (e.g., system 110 returns to the active mode), the multiplexer 125 switches the cache memory 120 from supply voltage VDD_MX back to supply voltage VDD_APC.

Figure 2:
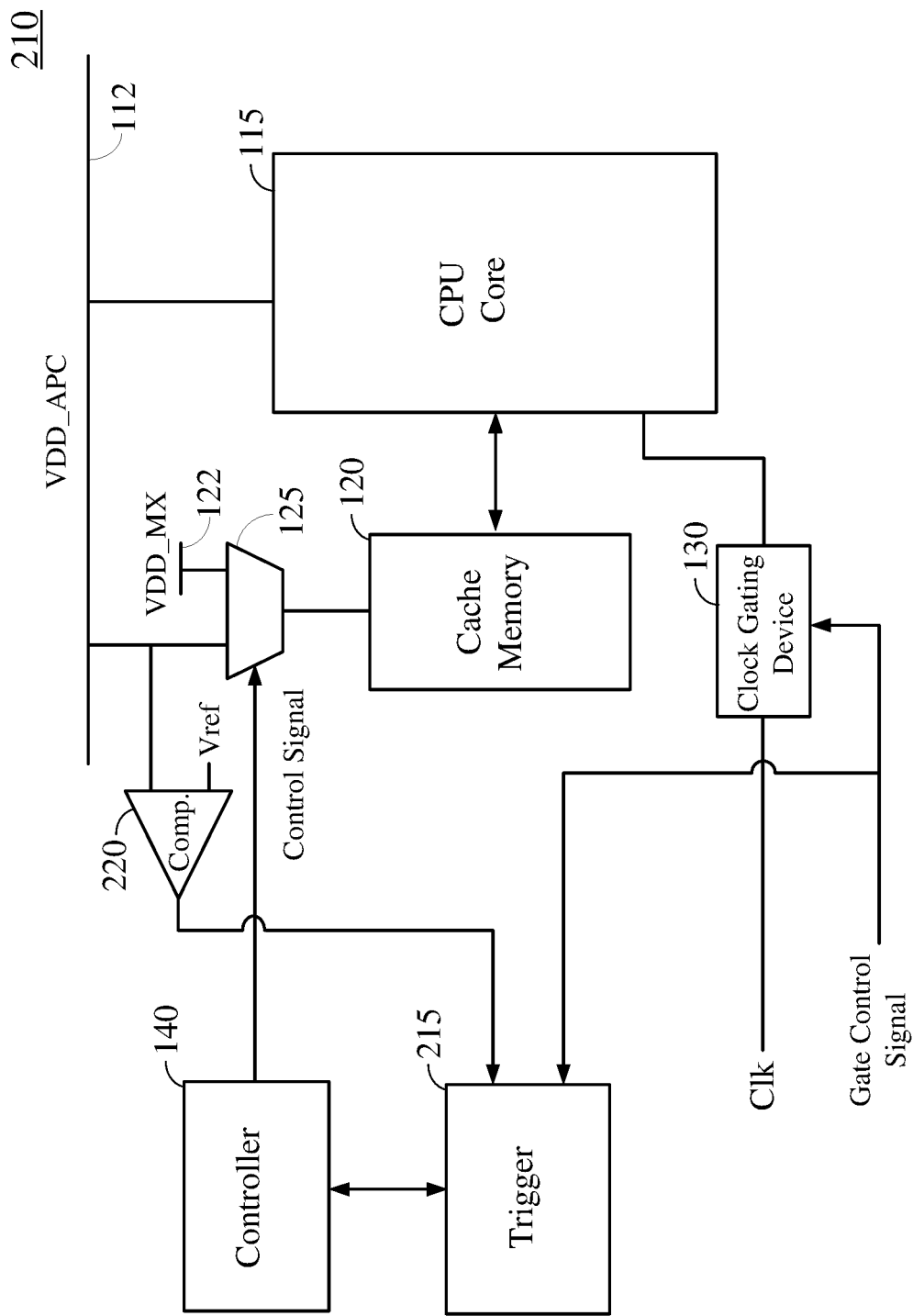
FIG. 2 shows an example of a system for reducing leakage power in a low power mode according to certain aspects of the present disclosure.

FIG. 2 shows an example of a system 210 for reducing leakage power in the first low power mode according to certain aspects of the present disclosure. The system 210 includes components of the system 110 in FIG. 1 (i.e., the one or more CPU cores 115, the cache memory 120, the multiplexer 125, the controller 140, and the clock gating device 130 discussed above). The system 210 also includes a trigger device 215 and a comparator 220 to reduce leakage power in the first low power mode, as discussed further below.

The comparator 220 is configured to compare supply voltage VDD_APC with a reference voltage (labeled "Vref"), and output a signal to the trigger device 215 indicating whether supply voltage VDD_APC is greater than the reference voltage Vref. The voltage level of the reference voltage Vref is set such that supply voltage VDD_APC is greater than the reference voltage Vref when the system 210 is in the turbo mode, and equal to or less than the reference voltage Vref when the system 210 is in the normal mode. Thus, the signal from the comparator 220 may indicates whether the system 210 is in the turbo mode, as discussed further below.

The trigger device 215 uses the signal from the comparator 220 to determine whether the system 210 is in the turbo mode. More particularly, the trigger device 215 may determine the system 210 is in the turbo mode when the signal from the comparator 220 indicates that supply VDD_APC is greater than the reference voltage Vref. The trigger device 215 may determine the system 210 is in the normal mode when the signal from the comparator 220 indicates that supply VDD_APC is not greater than the reference voltage Vref.

The trigger device 215 also determines when the clock signal Clk is gated, which may indicate that the CPU core 115 is idle. For example, the trigger device 215 may determine whether the clock signal Clk is gated by looking at the gate control signal. In this example, the logic state (i.e., one or zero) of the gate control signal controls whether the clock gating device 130 gates the clock signal Clk. This allows the trigger device 215 to determine whether the clock signal Clk is gated by looking at the logic state of the gate control signal. More particularly, if the current logic state of the gate control signal causes the clock gating device 130 to gate the clock signal Clk, then the trigger device 215 determines that the clock signal Clk is gated. If the current logic state of the gate control signal causes the clock gating device 130 to pass the clock signal Clk, then the trigger device 215 determines that the clock signal Clk is not gated. It is to be appreciated that the trigger device 215 is not limited to this example, and may employ another method to determine when the clock signal Clk is gated.

When supply voltage VDD_APC is greater than the reference voltage Vref (indicating that the system 210 is in the turbo mode) and the clock signal Clk is gated (indicating that the CPU core 115 is idle), the trigger device 215 triggers (instructs) the controller 140 to switch the cache memory 120 from supply voltage VDD_APC to supply voltage VDD_MX. As a result, the leakage power in the cache memory 120 is transferred from VDD_APC to VDD_MX, which significantly reduces leakage power in the cache memory 120 since VDD_MX is lower than VDD_APC. While lower than supply voltage VDD_APC, supply voltage VDD_MX is high enough for the cache memory 120 to retain its contents.

The trigger device 215 may instruct the controller 140 to switch the cache memory 120 back to supply voltage VDD_APC when the clock signal Clk is reenabled (e.g., the CPU core 115 returns to the active mode). This allows the cache memory 120 to provide the CPU core 115 with fast memory access when the CPU core 115 returns to the active mode in the turbo mode.

When supply voltage VDD_APC is not greater than the reference voltage Vref (indicating that the system 210 is in the normal mode) and the clock signal Clk is gated, the trigger device 215 does not trigger (instruct) the controller 140 to switch the cache memory 120 from supply voltage VDD_APC to supply voltage VDD_MX. This is because, in the normal mode, supply voltage VDD_MX is already coupled to the cache memory 120, as discussed above.

Figure 3:
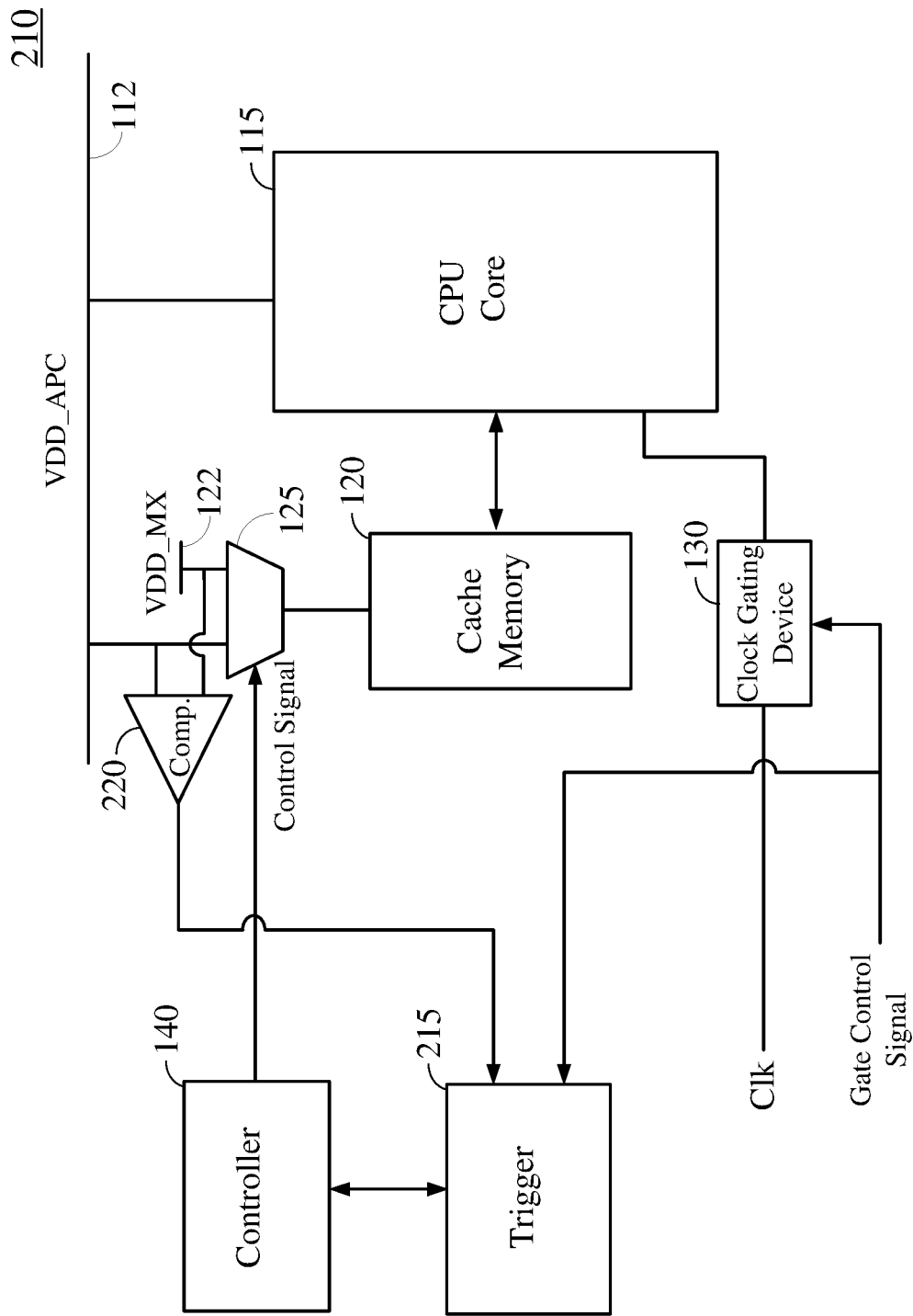
FIG. 3 shows the system in FIG. 2 further including a comparator configured to compare two supply voltages and output a signal based on the comparison according to certain aspects of the present disclosure.

In certain aspects, supply voltage VDD_MX may be used as the reference voltage Vref discussed above. In this regard, FIG. 3 shows an example in which supply voltage VDD_MX is used as the reference voltage Vref. In this example, the comparator 220 is configured to compare supply VDD_APC with supply VDD_MX, and output a signal to the trigger device 215 indicating whether supply voltage VDD_APC is greater than supply voltage VDD_MX.

The trigger device 215 uses the signal from the comparator 220 to determine whether the system 210 is in the turbo mode. More particularly, the trigger device 215 determines the system 210 is in the turbo mode when the signal from the comparator 220 indicates that supply voltage VDD_APC is greater than supply voltage VDD_MX. The trigger device 215 determines the system 210 is in the normal mode when the signal from the comparator 220 indicates that supply voltage VDD_APC is not greater than supply voltage VDD_MX.

In this example, when supply voltage VDD_APC is greater than supply voltage VDD_MX (indicating that the system 210 is in the turbo mode) and the clock signal Clk is gated (indicating that the CPU core 115 is idle), the trigger device 215 triggers (instructs) the controller 140 to switch the cache memory 120 from supply voltage VDD_APC to supply voltage VDD_MX. As a result, the leakage power in the cache memory 120 is transferred from VDD_APC to VDD_MX, which significantly reduces leakage power in the cache memory 120, as discussed above. The trigger device 215 may instruct the controller 140 to switch the cache memory 120 back to supply voltage VDD_APC when the clock signal Clk is reenabled (e.g., the CPU core 115 returns to the active mode).

When supply voltage VDD_APC is not greater than supply voltage VDD_MX (indicating that the system 210 is in the normal mode) and the clock signal Clk is gated, the trigger device 215 does not trigger (instruct) the controller 140 to switch the cache memory 120 from supply voltage VDD_APC to supply voltage VDD_MX. This is because, in the normal mode, supply voltage VDD_MX is already coupled to the cache memory 120, as discussed above.

The cache memory 120 discussed above may include level-1 (L1) cache memory, level-2 (L2) cache memory, or a combination of both. The cache memory 120 may receive the clock signal Clk or another clock signal to time operations of the cache memory 120. For example, the cache memory 120 may receive the clock signal Clk via the clock gating device 130. In this example, gating of the clock signal Clk also indicates that the clock to the cache memory 120 is gated, and therefore that the cache memory 120 is idle.

Figure 4:
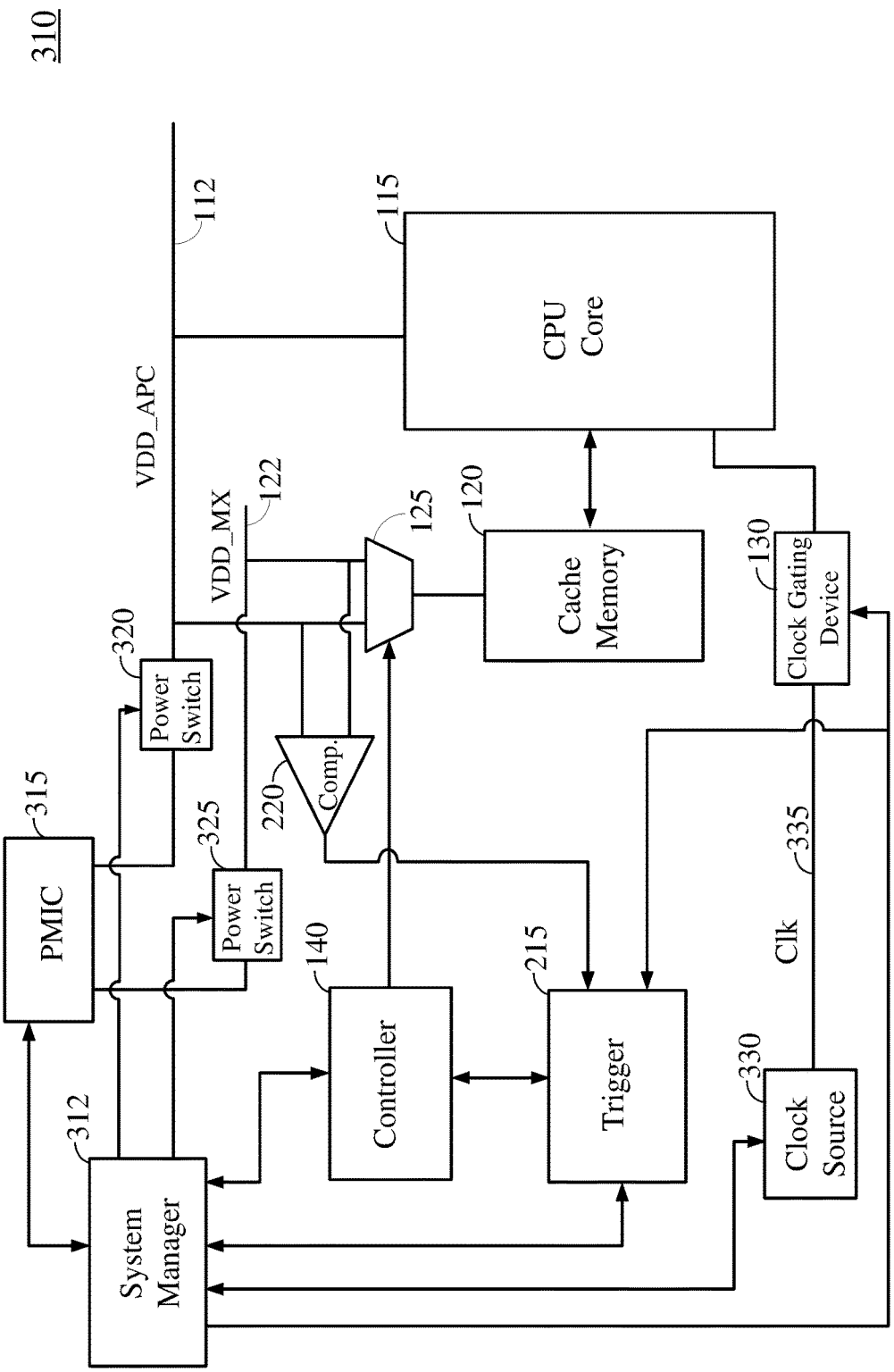
FIG. 4 shows the system in FIG. 3 further including a system manager for managing performance modes and power modes of the system according to certain aspects of the present disclosure.

FIG. 4 illustrates a system 310 according to aspects of the present disclosure. The system 310 includes the components of the system 210 in FIG. 2. The system 310 further includes a system manager 312, a power management integrated circuit (PMIC) 315, a first power switch 320, a second power switch 325, and an adjustable clock source 330. As discussed above, the system manager 312 is configured to manage the performance modes and power modes of the system 310.

The PMIC 315 is configured to generate supply voltage VDD_APC and supply voltage VDD_MX. For example, the PMIC 315 may generate each supply voltage from the voltage of a power source (not shown). The power source may include a battery (e.g., when the system 310 is incorporated in a mobile wireless device). The PMIC 315 may be integrated on the same chip as the CPU core 115 or on a separate chip. The PMIC 315 is configured to adjust the voltage level of supply voltage VDD_APC under the control of the system manager 312, as discussed further below.

The clock source 330 is configured to generate the clock signal Clk. The clock source 330 is coupled to the clock gating device 130 via a clock path 335. The clock path 335 may include one or more buffers (not shown), and may be part of a clock tree that distributes the clock signal Clk to the CPU core 115, as well as other devices on the chip. The clock source 330 is configured to adjust the frequency of the clock signal Clk under the control of the system manager 312, as discussed further below.

The first power switch 320 (also referred to as a bulk head switch (BHS)) is coupled between the PMIC 315 and the APC supply rail 112. The first power switch 320 is configured to selectively gate supply voltage VDD_APC under the control of the system manager 312, as discussed further below.

The second power switch 325 is coupled between the PMIC 315 and the MX supply rail 122. The second power switch 325 is configured to selectively gate supply voltage VDD_MX under the control of the system manager 312, as discussed further below.

As discussed above, the system manager 312 manages the performance modes of the system 310. For example, to place the system 310 in the normal mode, the system manager 312 may instruct the PMIC 315 to set the voltage level of supply voltage VDD_APC to a first voltage level, and instruct the clock source 330 to set the frequency of the clock signal Clk to a first clock frequency. The system manager 312 may also instruct the controller 140 to couple supply voltage VDD_MX to the cache memory 120. The controller 140 couples supply voltage VDD_MX to the cache memory 120 by instructing the multiplexer 125 to couple the MX supply rail 122 to the cache memory 120.

To place the system 310 in the turbo mode, the system manager 312 may instruct the PMIC 315 to set the voltage level of supply voltage VDD_APC to a second voltage level that is higher than the first voltage level. The system manager 312 may also instruct the clock source 330 to set the frequency of the clock signal Clk to a second clock frequency that is higher than the first clock frequency. Thus, the system manager 312 boosts (increases) the supply voltage and clock frequency of the CPU core 115 in the turbo mode. The higher voltage and higher clock frequency allow the CPU core 115 to operate at faster speeds in the turbo mode.

To place the system in the turbo mode, the system manager 312 may also instruct the controller 140 to couple supply voltage VDD_APC to the cache memory 120. The controller 140 couples supply voltage VDD_APC to the cache memory 120 by instructing the multiplexer 125 to couple the APC supply rail 112 to the cache memory 120. As discussed above, supply voltage VDD_APC is higher than supply voltage VDD_MX in the turbo mode. The higher supply voltage allows the cache memory 125 to operate at higher speeds in the turbo mode, and therefore provide the CPU core 115 with faster memory access in the turbo mode.

In one example, the system manager 312 may place the system 310 in the turbo mode in response to a request from an application running on the CPU core 115 for high performance. The system manager 312 may place the system 310 back in the normal mode when high performance is no longer needed by the CPU core 115.

As discussed above, the system manager 312 manages the power modes of the system 310. For example, in the active mode, the system manager 312 instructs the clock gating device 130 to pass the clock signal Clk to the CPU core 115. The system manager 312 also instructs the first power switch 320 to pass supply voltage VDD_APC to the APC supply rail 112, and the second power switch 325 to pass supply voltage VDD_MX to the MX supply rail 122. Thus, in the active mode, the CPU core 115 receives supply voltage VDD_APC and clock signal Clk. In the active mode, the CPU core 115 may operate in either the normal mode or the turbo mode (e.g., depending on performance requirements).

The system manager 312 may transition the system 310 from the active mode to the first low power mode, for example, when the CPU core 115 completes a task and does not immediately start the next task. In this example, the system manager 312 may place the CPU core 115 in the first low power mode after the CPU core 115 completes the task. After the CPU core 115 is placed in the first low power mode, a timer or another device may output an interrupt signal to the system manager 312 when it is time for the CPU core 115 to start the next task. In response, the system manager 312 returns the CPU core 115 to the active mode to perform the next task.

To place the system 310 in the first low power, the system manager 312 instructs the clock gating device 130 to gate the clock signal Clk to the CPU core 115, which blocks the clock signal Clk from the CPU core 115. Gating the clock signal Clk reduces dynamic power consumption by stopping switching activity (e.g., transistor switching) in the CPU core 115 due to the clock signal Clk. In the first low power mode, the system manager 312 leaves the first and second power switches 320 and 325 turned on. As a result, supply voltage VDD_APC is maintained on the APC supply rail 112, and supply voltage VDD_MX is maintained on the MX supply rail 122. This results in leakage current in the CPU core 115 and cache memory 120 in the first low power mode. To return the system 310 to the active mode, the system manager 312 instructs the clock gating device 130 to ungate the clock signal Clk.

As discussed above, the trigger device 215 reduces leakage power in the cache memory 120 in the first low power mode when the clock signal Clk is gated in the turbo mode. In this regard, the trigger device 215 detects when the clock signal Clk is gated by the system manager 312. For example, the trigger device 215 may detect when the clock signal Clk is gated based on the logic state of the gate control signal to the clock gating device 130, as discussed above.

When the trigger device 215 detects that the clock signal Clk is gated, the trigger device 215 determines whether supply voltage VDD_APC is greater than supply voltage VDD_MX based on the output signal of the comparator 220. If the output signal of the comparator 220 indicates that supply voltage VDD_APC is greater than supply voltage VDD_MX, then the trigger device 215 instructs the controller 140 to switch the cache memory 120 from supply voltage VDD_APC to supply voltage VDD_MX. The controller 140 performs the switch by instructing the multiplexer 125 to couple the MX supply rail 122 to the cache memory 120. Switching the cache memory 120 to supply voltage VDD_MX significantly reduces leakage power in the first low power mode, as discussed above. When the trigger device 215 detects that the clock signal Clk is reenabled (i.e., ungated), the trigger device 215 instructs the controller 140 to switch the cache memory 120 back to supply voltage VDD_APC.

If the output signal of the comparator 220 indicates that supply voltage VDD_APC is not greater than supply voltage VDD_MX, then the trigger device 215 does not trigger a switch from VDD_APC to VDD_MX since the cache memory 120 is already coupled to VDD_MX in this case.

In certain aspects, the trigger device 215 may consider whether the controller 140 is in the process of switching the cache memory 120 between supply voltages before triggering the controller 140 to switch supply voltages. For example, the controller 140 may be in the processing of switching the cache memory 140 between supply voltages when the system 310 is in the process of switching performance modes (e.g., switching from the normal mode to the turbo mode or vice versa). In this example, when the controller 140 is in the process of switching the cache memory 120 between supply voltages (e.g., to change performance modes), the controller 140 may send a signal to the trigger device 215 indicating that the switch is in progress. In response to this signal, the trigger device 215 may refrain from triggering the controller 140 while the switch is in progress.

The system manager 312 may place the CPU core 115 in the second low power mode, for example, when the CPU core 115 is expected to be idle for a relatively long period of time. This may occur, for example, when no user activity is detected for a certain period of time. The second low power mode is deeper than the first low power mode, as discussed further below.

To place the system 310 in the second low power mode, the system manager 312 power collapses supply voltage VDD_APC on the APC supply rail 112. The system manger 312 may do this by instructing the first power switch 320 to gate supply voltage VDD_APC. Power collapsing supply voltage VDD_APC reduces leakage power to approximately zero, and therefore results in greater power savings than the first low power mode, which maintains supply voltage VDD_APC. The system manager 312 may also power collapse supply voltage VDD_MX on the MX supply rail 122. The system manager 312 may do this by instructing the second power switch 325 to gate supply voltage VDD_MX. The system manager 312 may also instruct the clock gating device 130 to gate the clock signal Clk.

To further reduce power in the second low power mode, the system manager 312 may also turn off the portion of the PMIC 315 responsible for generating supply voltage VDD_APC. This portion of the PMIC 315 may include a voltage regulator configured to convert a voltage of a power source (e.g., battery) into supply voltage VDD_APC. The voltage regulator may include a low dropout (LDO) regulator, a switching regulator, or a combination of both. While turning off the portion of the PMIC 315 further reduces power, this may increase the time it takes for the system to come out of the second low power mode (i.e., increase latency). The system manager 312 may also turn off the portion of the PMIC 315 responsible for generating supply voltage VDD_MX. In addition, the system manager 312 may turn off the clock source 330.

To return to the active mode from the second low power mode, the system manger 312 may instruct the first power switch 320 to ungate supply voltage VDD_APC. The system manager 312 may also instruct the second power switch 325 to ungate supply voltage VDD_MX. For the embodiment in which a portion of the PMIC 315 is turned off in the second low power mode, the system manager 312 may turn the portion of the PMIC 315 back on. In addition, for the embodiment in which the clock source 330 is turned off in the second low power mode, the system manager 312 may turn the clock source 330 back on.

As discussed above, the system 310 is not limited to the first and second low power modes. For example, the system 310 may also be placed in any one of one or more intermediate low power modes between the first low power mode and the second low power mode.

In certain aspects, the trigger device 215 may consider whether the APC supply rail 112 is being power collapsed before triggering the controller 140 to switch supply voltages. For example, the system manager 312 may output a signal to the trigger device 215 indicating when the APC supply rail 112 is being power collapsed (e.g., the CPU core 115 is entering the second low power mode). In response to this signal, the trigger device 215 may refrain from triggering the controller 140 since power collapsing the APC supply rail 112 reduces leakage power from the APC supply rail 112 to approximately zero.

Figure 5:
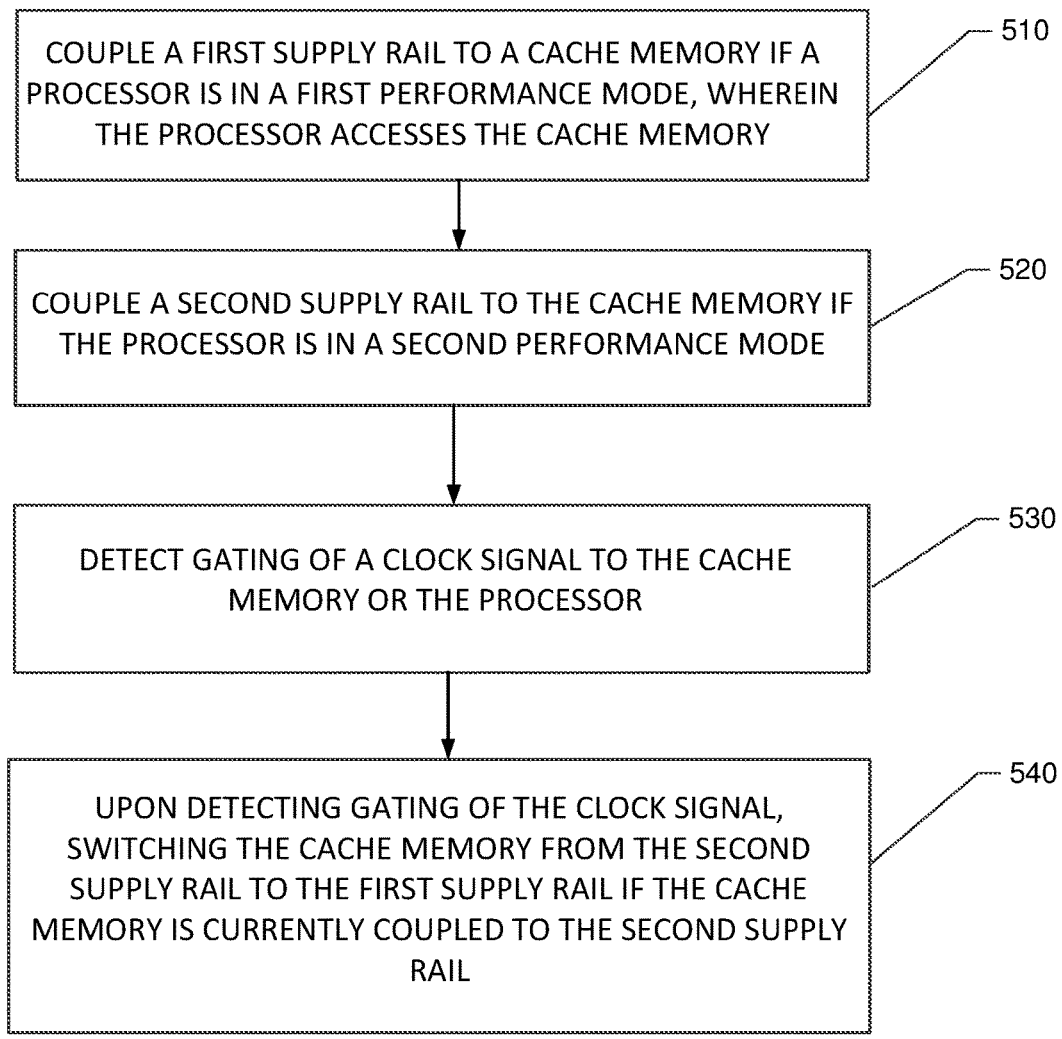
FIG. 5 is a flowchart illustrating a method for managing leakage power according to certain aspects of the present disclosure.

FIG. 5 is a flowchart illustrating a method 500 for managing leakage power according to certain aspects of the present disclosure. The method 500 may be performed by the multiplexer 125, the controller 140 and the trigger device 215.

At block 510, a first supply rail is coupled to a cache memory if a processor is in a first performance mode, wherein the processor accesses the cache memory. For example, the processor may correspond to the CPU core 115, the first performance mode may correspond to the normal mode, and the first supply rail may correspond to the MX supply rail 122.

At block 520, a second supply rail is coupled to the cache memory if the processor is in a second performance mode. For example, the second performance mode may correspond to the turbo mode, and the second supply rail may correspond to the APC supply rail 112.

At block 530, gating of a clock signal to the cache memory or the processor is detected. For example, the clock signal (e.g., clock signal Clk) may be gated by a clock gating device (e.g., clock gating device 130) according to a gate control signal. In this example, gating of the clock signal may be detected based on a logic state of the gate control signal.

At block 540, upon detecting gating of the clock signal, the cache memory is switched from the second supply rail to the first supply rail if the cache memory is currently coupled to the second supply rail.

It is to be appreciated that the present disclosure is not to limited to the terminology used herein to describe aspects of the present disclosure. For example, a CPU core may also be referred to as a processor core, a processor, or another term. Also, cache memory may also be referred to as core memory, embedded memory, or another term. Further, although the term "turbo" is used to refer to a high-performance mode of the CPU core 115, it is to be appreciated that other terms may be used to refer to the high-performance mode. Generally speaking, the high-performance mode may be characterized by increased supply voltage and clock frequency of the CPU core to boost processing speeds.

In certain aspects, the frequency of the clock signal Clk is at least 10 percent higher or at least 20 percent higher in the turbo mode than the normal mode.

In certain aspects, supply voltage VDD_APC is at least 10 percent higher or at least 20 percent higher than supply voltage VDD_MX in the turbo mode.

In certain aspects, supply voltage VDD_APC is at least 10 percent higher or at least 20 percent higher in the turbo mode than in the normal mode.

The trigger device 215, the controller 140, and the system manager 312 discussed above may be implemented with a general-purpose processor, a digital signal processor (DSP), a state machine, an application specific integrated circuit (ASIC), a field programmable gate array (FPGA) or other programmable logic device, discrete hardware components (e.g., logic gates), or any combination thereof designed to perform the functions described herein. A processor may perform the functions described herein by executing software comprising code for performing the functions. The software may be stored on a computer-readable storage medium, such as a RAM, a ROM, an EEPROM, an optical disk, and/or a magnetic disk.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A system, comprising:
   a cache memory, wherein a processor accesses the cache memory;
   a multiplexer configured to selectively couple a first supply rail or a second supply rail to the cache memory;
   a controller configured to instruct the multiplexer to couple the first supply rail to the cache memory if the processor is in a first performance mode, and to instruct the multiplexer to couple the second supply rail to the cache memory if the processor is in a second performance mode; and
   a trigger device configured to detect gating of a clock signal to the cache memory or the processor, and, upon detecting gating of the clock signal, to instruct the controller to switch the cache memory from the second supply rail to the first supply rail if the cache memory is currently coupled to the second supply rail,
   wherein the trigger device is configured to receive a signal indicating whether the second supply rail is being power collapsed, and to refrain from instructing the controller to switch the cache memory from the second supply rail to the first supply rail if the signal indicates that the second supply rail is being power collapsed.

2. The system of claim 1, wherein the second supply rail is coupled to the processor.

3. The system of claim 1, wherein a supply voltage on the second supply rail is set to a higher voltage level in the second performance mode than the first performance mode.

4. The system of claim 1, wherein a first supply voltage on the first supply rail is lower than a second supply voltage on the second supply rail in the second performance mode.

5. The system of claim 1, wherein the trigger device is configured to detect ungating of the clock signal, and, upon detecting ungating of the clock signal, to instruct the controller to switch the cache memory from the first supply rail to the second supply rail if the processor is to return to an active mode in the second performance mode.

6. The system of claim 1, wherein the clock signal is gated by a clock gating device according to a gate control signal, and the trigger device is configured to detect gating of the clock signal based on a logic state of the gate control signal.

7. A system, comprising:
   a cache memory, wherein a processor accesses the cache memory;
   a multiplexer configured to selectively couple a first supply rail or a second supply rail to the cache memory;
   a controller configured to instruct the multiplexer to couple the first supply rail to the cache memory if the processor is in a first performance mode, and to instruct the multiplexer to couple the second supply rail to the cache memory if the processor is in a second performance mode; and
   a trigger device configured to detect gating of a clock signal to the cache memory or the processor, and, upon detecting gating of the clock signal, to instruct the controller to switch the cache memory from the second supply rail to the first supply rail if the cache memory is currently coupled to the second supply rail; and
   a comparator configured to compare a first supply voltage on the first supply rail with a second supply voltage on the second supply rail, and to output an output signal based on the comparison indicating whether the second supply voltage is greater than the first supply voltage;
   wherein, upon detecting gating of the clock signal, the trigger device is configured to instruct the controller to switch the cache memory from the second supply rail to the first supply rail if the output signal of the comparator indicates that the second supply voltage is greater than the first supply voltage.

8. The system of claim 7, wherein the second supply voltage on the second supply rail is set to a higher voltage level in the second performance mode than the first performance mode.

9. The system of claim 1, wherein the controller is configured to generate a signal indicating whether a switch between the first performance mode and the second performance mode is in progress, and the trigger device is configured to refrain from instructing the controller to switch the cache memory from the second supply rail to the first supply rail if the signal indicates that the switch between the first performance mode and the second performance mode is in progress.

10. The system of claim 1, wherein the controller is configured to switch the cache memory from the second supply rail to the first supply rail by instructing the multiplexer to couple the first supply rail to the cache memory.

11. A method for managing leakage power, comprising:
    coupling a first supply rail to a cache memory if a processor is in a first performance mode, wherein the processor accesses the cache memory;
    coupling a second supply rail to the cache memory if the processor is in a second performance mode;
    detecting gating of a clock signal to the cache memory or the processor; and
    upon detecting gating of the clock signal, switching the cache memory from the second supply rail to the first supply rail if the cache memory is currently coupled to the second supply rail; and
    comparing a first supply voltage on the first supply rail with a second supply voltage on the second supply rail,
    wherein switching the cache memory from the second supply rail to the first supply rail comprises switching the cache memory from the second supply rail to the first supply rail if the second supply voltage is greater than the first supply voltage.

12. The method of claim 11, wherein the second supply rail is coupled to the processor.

13. The method of claim 11, further comprising setting a supply voltage on the second supply rail to a higher voltage level in the second performance mode than the first performance mode.

14. The method of claim 11, wherein a first supply voltage on the first supply rail is lower than a second supply voltage on the second supply rail in the second performance mode.

15. The method of claim 11, further comprising:
    detecting ungating of the clock signal; and
    upon detecting ungating of the clock signal, switching the cache memory from the first supply rail to the second supply rail if the processor is to return to an active mode in the second performance mode.

16. The method of claim 11, wherein the clock signal is gated by a clock gating device according to a gate control signal, and detecting gating of the clock signal comprises detecting gating of the clock signal based on a logic state of the gate control signal.

17. The method of claim 11, wherein the second supply voltage on the second supply rail is set to a higher voltage level in the second performance mode than the first performance mode.

18. The method of claim 11, wherein the second supply voltage is set to a higher voltage level than the first supply voltage in the second performance mode.

* * * * *